3,440,262
FLUID AROMATIC SILOXANE BLOCK
COPOLYMERS
Alan L. Culpepper, Midland, Mich., assignor to Dow
Corning Corporation, Midland, Mich., a corporation
of Michigan
No Drawing. Filed Aug. 23, 1965, Ser. No. 481,898
Int. Cl. C07f 7/02; C08g 31/02, 47/00
U.S. Cl. 260—448.2                           6 Claims

ABSTRACT OF THE DISCLOSURE

A thermally stable fluid aromatic siloxane block copolymer which is useful in lubricating glass cloth is disclosed. The siloxane block copolymer has diphenylsiloxane blocks of 3 to 100 units per block and blocks of at least two units of monoorganosiloxane units where the organic radicals are phenyl, meta-xenyl or naphthyl.

---

This invention relates to a fluid aromatic siloxane block copolymer.

An object of this invention is to provide a heat stable fluid siloxane. Another object of this invention is to provide a heat stable fluid lubricant. Still another object is to provide a fluid aromatic siloxane block copolymer. Other objects and advantages will become apparent from the following detailed description of the present invention.

This invention relates to a fluid aromatic siloxane block copolymer consisting essentially of (A) blocks of diphenylsiloxane units, said blocks having from 3 to 100 diphenylsiloxane units per block, and (B) blocks of monoorganosiloxane units in which the organo radicals are monovalent radicals selected from the group consisting of phenyl, metaxenyl and naphthyl radicals, said blocks having at least 2 monoorganosiloxane units per block; the blocks of (B) being present in an amount from 30 to 70 mol percent based on the total number of moles of (A) and (B) present in said block copolymer.

The fluid aromatic siloxnae block copolymer can be prepared by mixing monoorganotrichlorosilane and hydroxyl endblocked polydiphenylsiloxane in the presence of an acid acceptor. The monoorganotrichlorosilrane can be phenyltrichlorosilane, meta-xenyltrichlorosilane or naphthyltrichlorosilane. These aromatic silanes can be mixed with an inert organic solvent such as toluene, hexane, cyclohexane, octane, xylene or benzene and acid acceptor such as pyridine, α-picoline and organic amines and thereafter the hydroxyl endblocked polydiphenylsiloxane can be added. The polydiphenylsiloxane need not be added last but this is preferred. Organic solvent can be used in any amounts up to 90 weight percent or more based on the weight of (A) and (B). More than 90 weight percent is usually considered to be economically impractical. The hydroxyl endblocked polydiphenylsiloxane can contain from 3 to 100 diphenylsiloxane units per molecule, preferably from 10 to 50 diphenylsiloxane units per molecule.

The reaction goes readily at room temperature but higher temperature up to the reflux temperature of the solution can be used when excess acid acceptor is present. Excess acid acceptor up to 25 percent or more is desirable at the higher temperatures. The reaction goes to completion at room temperature in a reltaively short time, from 15 to 60 minutes. Longer reaction times can be used such as up to one day but no apparent advantages are observed. After the reaction is complete, the fluid siloxane block copolymer is washed with water to remove the acid acceptor-hydrochloride and to hydrolyze any remaining silicon-bonded chlorine atoms.

The siloxane blocks (B) can be present in an amount from 30 to 70 mol percent based on the total number of moles of (A) and (B) present in the block copolymers. Preferably, (B) is present in an amount of from 40 to 60 mol percent.

The product is a fluid block copolymer which is stable up to temperatures in excess of 300° C. The fluid aromatic siloxane block copolymer is a lubricant and is particularly useful to lubricate glass cloth.

The following examples are illustrative only and should not be construed as limiting the present invention which properly delineated in the appended claims.

EXAMPLE 1

In a 250 ml. three-necked flask fitted with a stirrer, condenser and addition funnel was placed 15 g. of phenyltrichlorosilane, 10 g. of pyridine and 50 ml. of toluene. The solution was stirred and then 15 g. of diphenylsiloxane polymers, having an average of 3.6 diphenylsiloxane units per molecule, in 15 ml. of toluene was added. The reaction mixture was stirred for 30 minutes and then washed 5 times with water. The residual water was removed by azeotropic distillation and the solvent was removed by vacuum distillation. The product was a viscous fluid siloxane block copolymer.

EXAMPLE 2

Example 1 was repeated, but instead of phenyltrichlorosilane, meta-xenyltrichlorosilane was used. The product was a viscous fluid siloxane block copolymer.

EXAMPLE 3

When 1 mole of naphthyltrichlorosilane, 3 moles of α-picoline, and 2 moles of hydroxyl-endblocked diphenylsiloxane polymer having an average of 100 silicon atoms per molecule are reacted as in Example 1, a fluid siloxane block copoylmer is obtained.

EXAMPLE 4

When 2 moles of phenyltrichlorosilane, 4 moles of pyridine and 1 mole of hydroxyl-endblock diphenylsiloxane polymer having an average of 50 diphenylsiloxane units per molecular are reacted as in Example 1, a fluid siloxane block copolymer is obtained.

EXAMPLE 5

When 1 mole of phenyltrichlorosilane, 3 moles of pyridine and 1 mole of a hydroxyl-endblocked diphenylsiloxane polymer having an average of 10 diphenylsiloxane units per molecule are reacted as in Example 1, a fluid siloxane block copolymer is obtained.

That which is claimed is:

1. A fluid aromatic siloxane block copolymer consisting essentially of:
   (A) blocks of diphenylsiloxane units, said blocks having from 3 to 100 diphenylsiloxane units per block, and
   (B) blocks of monoorganosiloxane units in which the organo radicals are monovalent radicals selected from the group consisting of phenyl, meta-xenyl and naphthyl radicals, said blocks having at least 2 monoorganosiloxane units per block,
   the blocks of (B) being present in an amount from 30 to 70 mol percent based on the total number of moles of (A) and (B) present in said block copolymer.

2. The fluid aromatic siloxane block copolymer of claim 1 in which the organo radical of (B) is a phenyl radical.

3. The fluid aromatic siloxane block copolymer of claim 1 in which (B) is present in an amount from 40 to 60 mol percent.

4. The fluid aromatic siloxane block copolymer of claim 1 in which the number of diphenylsiloxane units of block (A) is from 10 to 50 diphenylsiloxane units per block.

5. The fluid aromatic siloxane block copolymer of claim 3 in which the organo radical of (B) is a phenyl radical.

6. The fluid aromatic siloxane block copolymer of claim 4 in which the organo radicals of (B) is a phenyl radical.

References Cited

UNITED STATES PATENTS 2,486,162   10/1949   Hyde _____ 260—46.5

TOBIAS E. LEVOW, Primary Examiner.

J. P. PODGORSKI, Assistant Examiner.

U.S. Cl. X.R.

260—46.5; 117—124